Nov. 10, 1936.　　　　E. E. ARNOLD　　　　2,060,480
COMMUTATOR STRUCTURE
Filed Aug. 17, 1934
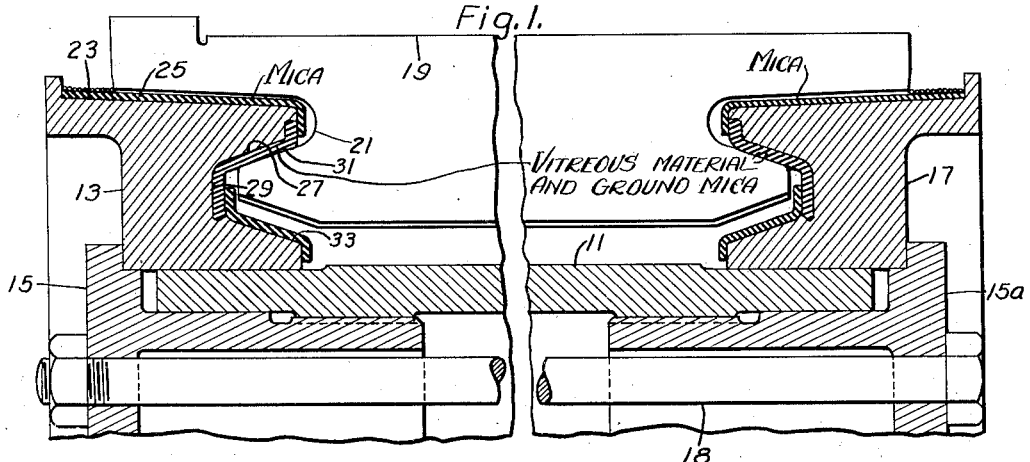
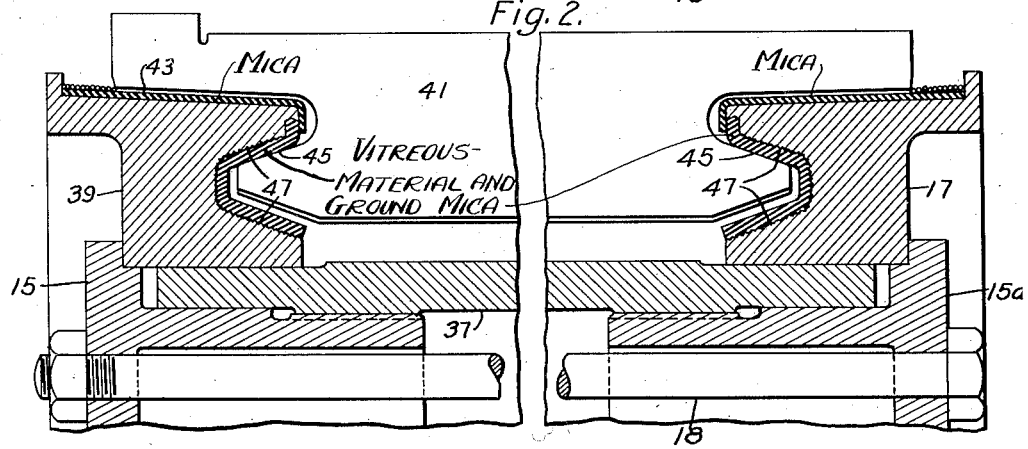
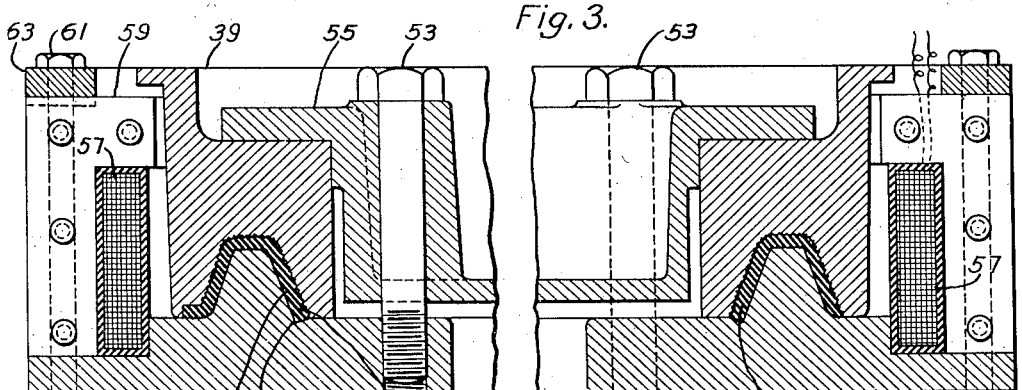
WITNESSES:　　　　　　　　　　INVENTOR
Fred C. Williams　　　　　　　Edwin E. Arnold
　　　　　　　　　　　　　　　BY
　　　　　　　　　　　　　　　　ATTORNEY Patented Nov. 10, 1936

2,060,480

UNITED STATES PATENT OFFICE 2,060,480

COMMUTATOR STRUCTURE

Edwin E. Arnold, Pittsburgh, Pa., assignor to Westinghouse Electric & Manufacturing Company, East Pittsburgh, Pa., a corporation of Pennsylvania Application August 17, 1934, Serial No. 740,232

2 Claims. (Cl. 171—320)

My invention relates to dynamo-electric machines and particularly to commutator constructions for such machines.

An object of my invention is to provide a commutator assembly comprising electric insulating material capable of resisting high pressure and high temperature, and embodying ground mica and an inorganic bond.

Another object of my invention is to provide a commutator assembly having tightly adherent to one face thereof a layer of dense, homogeneous electric-insulating material.

Another object of my invention is to provide a commutator assembly having a layer of vitreous material and powdered mica on that face adapted to receive the higher pressure during operation and a layer of mica on that face subjected to lower pressure during operation.

Other objects of my invention will either be apparent from the following description of one form of device embodying my invention and its method of application or will be specifically pointed out hereinafter.

In practicing my invention, I provide a commutator structure including a V-ring having tightly adherent to one face or surface thereof a layer of mixed vitreous material and powdered mica.

In the single sheet of drawing:

Figure 1 is a view in longitudinal section through a commutator structure embodying my invention;

Fig. 2 is a view in longitudinal section of a modified form of commutator structure embodying my invention, and Fig. 3 is a view in section through an assembly rig utilized by me in making commutators according to my invention.

It is well known that dynamo-electric machines including both generators and motors are being subjected to increasingly greater stresses in operation, which stresses include among others, those caused by greater peripheral speeds as well as those caused by higher operating temperatures. The ordinary built up mica V-rings are, of course, not homogeneous and there is a tendency, when such mica V-rings are subjected to relatively high compressive values, for one part of the V-ring to slip relatively to the other part because of the fact that mica is fissile, the plurality of layers being bonded by the use of a relatively small amount of suitable binder. It is obvious also that such built-up and composite mica V-rings cannot withstand relatively high temperatures and there is a demand for a commutator which can be operated at temperatures up to 200° C. and even higher.

Referring first to Fig. 1 of the drawing, I have there shown a commutator center 11 having a V-ring 13 at its inner end which latter may be held in place by an annular flange 15, although I do not wish to be limited to such structure, as any desired holding means for the V-ring may be employed. I provide also a front or outer V-ring 17 which may be held in place by any suitable means well known in the art such as clamping bolts 18 extending through an outer flange 15a.

The commutator assembly includes also a plurality of commutator bars 19 which may be of the ordinary copper or any suitable copper alloy type and may have a V-shaped notch or recess 21 provided therein in a manner well known in the art.

The outer face or surface 23 of the V-ring 13 may have located thereon a relatively simple ring 25, of mica, since the face 23 will not be subjected to the higher pressures during operation of the commutator. The inner annularly-extending face 27 of the V-ring 13 as well as a radially extending face 29 have tightly adherent thereto a layer 31 of dense, solid, unyielding homogeneous material, which is made of a mixture of a vitreous material and powdered mica. The method of applying this material will be described hereinafter in detail and I wish to point out now that the layer 31 of such material is compacted in place, will withstand high temperatures, remains solid up to 500° C., and will also withstand relatively high compression stresses. This material thus comprises ground mica and an inorganic bonding substance, constituting, therefore, an entirely inorganic electric-insulating material. Other inner faces 33 of the V-ring may have located thereagainst a layer 35 of composite mica in a manner well known in the art, since these faces are not subjected to large stresses during operation.

Referring now to Fig. 2 of the drawing, I have there shown a commutator center 37, and a V-ring 39 located thereon at its inner end and supporting a plurality of commutator bars 41 in a manner well known in the art. A ring 43 of mica is located against the outer face of V-ring 39, while a layer 45 of electric-insulating material of the same character as ring or layer 31 is tightly adherent against the roughened inner faces 47 of the respective V-rings included in the commutator structure at the front and the back thereof.

I will now describe the raw materials used in my improved V-ring of electric-insulating material, particularly in connection with one form of assembly device or shop tool shown schematically only in Fig. 3 of the drawing. I take a mixture of a lead borate and ground or powdered mica and make sure that the raw ingredients are thoroughly and uniformly mixed. I then pre-shape the same to approximately final form at relatively low temperature and relatively low pressure. The object of this step in the treatment of the raw material is to provide a mass of material which has at least approximately the final shape.

The pre-shaped mass is then heated, free of restraint, to a temperature just below that at which it becomes plastic, which temperature value is on the order of 500° C. I then locate this pre-heated pre-shaped mass in a pre-heated mold which may, for instance, include an annularly shaped die 49 having an upper surface which is complementary to the inner surface of V-ring 39. A space 51 is provided between the cooperating members 39 and 49, of the desired shape and dimensions of the layer 45 of electric-insulating material. The material which has been pre-shaped as described above is located in the space 51 and is then subjected to high pressure as by the use of a plurality of clamping bolts 53 extending through an annular clamping member 55 while at the same time the parts 39 and 49 are heated inductively, for instance, by the action of a coil 57. I may also use a plurality of sets of radially and vertically extending laminations 59 in a manner well known in the art to increase the number of active lines of force threading the metal members 39 and 49. A plurality of bolts 61 extend through an annular clamping ring 63 to hold the sets of laminations in proper operative positions on base 49. This heat and pressure treatment is continued for a relatively short time, say on the order of 5 to 10 minutes, after which it will be found that the layer 45 has adhered tightly to the inner surface of ring 39, suitable precautions having been taken to insure that it will not adhere to the surface of die 49 as by applying to this surface a thin layer of some material such as talc or graphite to prevent adhesion between the material of layer 45 and the surface of member 49. The V-ring and its tightly adhering layer is then removed and permitted to cool and in order to be sure that the dimensions of the adherent layer are correct, a machining operation thereof may be effected to obtain the desired accurate dimensions. This machining may be by grinding or by the use of lathe cutting tools.

I do not desire to be limited to the inductive method of heating the V-ring and the cooperating mold or die but may use any other method of heating these parts.

A layer of electric insulating material made as hereinbefore described provides a compacted, dense, solid and unyielding layer of electric-insulating material comprising ground mica and an inorganic bond, which retains its characteristics of being able to resist high compressive stresses and its electric-insulating characteristics at temperatures up to 500° C. Since it is non-fissible, there will be no tendency for the layers to move relatively to each other as happens in the case of mica insulation when subjected to relatively high stresses and high temperatures. While I have shown a layer of my improved tightly adherent layer of electric insulating material including a vitreous material and powdered mica as applied to the inner surface only of a V-ring, I do not wish to be limited thereto since it may be desirable, in some cases, to apply such a layer to the outer surface also.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A commutator structure including a V ring having a high-pressure receiving surface and a low-pressure-receiving surface, a tightly adherent electric-insulating coating comprising a vitreous material and ground mica on the high-pressure receiving surface and a layer of mica at the low-pressure-receiving surface of the V ring.

2. A commutator structure including a V ring having an inner and an outer face, a coating of a tightly-adherent unyielding homogeneous electric-insulating material including a vitreous material and ground mica on the inner surface and an electric-insulating layer of mica and a binder located against the outer face.

EDWIN E. ARNOLD.